Patented Mar. 24, 1970

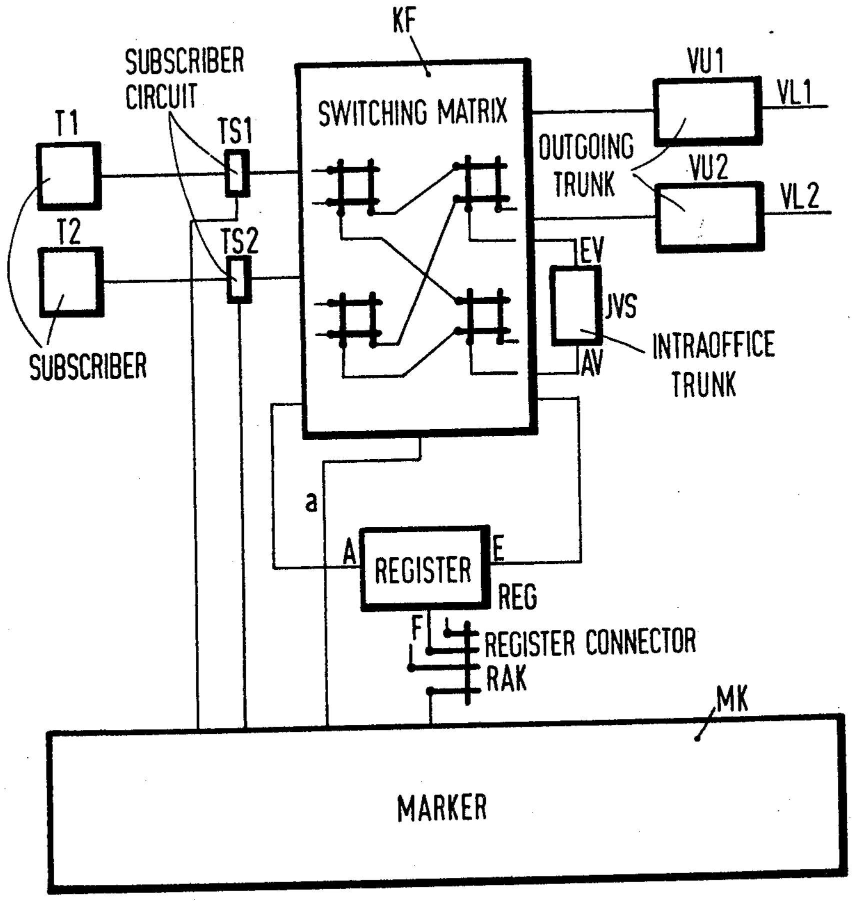
KF
SUBSCRIBER
CIRCUIT
SWITCHING MATRIX
VU1
VL1
T1
TS1
OUTGOING
TRUNK
VU2
VL2
T2
TS2
EV
JVS
INTRAOFFICE
TRUNK
AV
SUBSCRIBER
a
A
REGISTER
E
REG
F
REGISTER CONNECTOR
RAK
MK
MARKER United States Patent Office 3,502,816

3,502,816

CIRCUIT ARRANGEMENT PROVIDING CENTRAL CONTROL FOR TELEPHONE EXCHANGE INSTALLATIONS

Peter Gerke, Munich, Karl Rutkowski, Pullach, near Munich, and Hans Baur, Munich, Germany, assignors to Siemens Aktiengesellschaft, Munich, Germany, a corporation of Germany Filed Mar. 28, 1966, Ser. No. 537,914
Claims priority, application Germany, Apr. 1, 1965, S 96,314
Int. Cl. H04m 3/42
U.S. Cl. 179—18 4 Claims

ABSTRACT OF THE DISCLOSURE

A telephone exchange system including a switching matrix or network which makes connections between calling and called subscribers through use of registers, which are then unnecessary during the continuation of the connection. Circuits such as intraoffice and outgoing trunks necessary both for completing and maintaining the connection are also connected to the subscribers over the switching matrix. So that the connection to the register may be maintained in the circuit only so long as necessary, it is first connected in series with the intraoffice or outgoing trunk and the calling subscriber, through two switch connections through the matrix. When the connection is completed, the register is released and the trunk is then connected between the subscribers over a single switch connection through the matrix.

GENERAL DESCRIPTION

This invention relates to a telephone exchange installation, and, more particularly, to a central control system for the exchange installation.

In accordance with the invention, the exchange installation includes a switching matrix or network having a plurality of possible internal coupling or connection paths, the completion of these paths being controlled by a marker in accordance with demanded circuit connections. A plurality of subscriber substations is connected to the input of the matrix at a corresponding plurality of input terminals. A plurality of transmission lines is connected to a corresponding plurality of output terminals of the matrix. The transmission lines typically are grouped in accordance with traffic routes.

A plurality of internal connecting devices have their input and output terminals connected across respectively associated output terminals of the matrix. In addition, a plurality of registers have their input and output terminals connected to respective output and input terminals of the matrix.

In operation, the marker recognizes the initiation of a call on the part of a subscriber and switches the subscriber circuit to a free register. The register emits a dial tone, whereupon the subscriber may begin selection of a desired receiving subscriber by dialing the identification of such a subscriber. When such selection occurs, the register receives the information designating the latter, typically a dial information code. The register may temporarily store such a code, and is operative to direct the marker to complete a circuit through the matrix in accordance with the dial code information. The connection desired may be either internally to a subscriber connected to the matrix or externally to a remote subscriber. When the desired connection is completed, two coupling or switch paths through the matrix are in existence and include the register in the completed circuit.

However, upon completion of the desired circuit, the register further controls the marker to establish a single direct coupling through the matrix in accordance with the connection demanded by the subscriber. When the single direct coupling is established, the two previously established switch paths are released, thereby also releasing the register. The register is thus made available for subsequent subscriber selection demands.

The circuits necessary for maintaining a completed connection are provided in the apparatus associated with that connection, be it an internal or an outgoing external connection. Thus, highly efficient utilization of the various circuit systems is achieved. Since the initiating and the sustaining functions are provided in separate circuit systems providing only those respective functions, the switching between these systems is also simplified, reducing the complexity and expense of the control system of the installation. Upon termination of a previously completed connection, the marker may directly respond to an appropriate terminating indication to terminate the coupling within the matrix and thus release the subscriber circuits and the sustaining connection systems previously connected in the completed circuit, for subsequent operations.

STATE OF THE PRIOR ART

The use in dial telephone exchange systems of counting pulse transmitters and registers for transmitting and receiving dial signals is well known. However, prior art systems require the use of quick operating switches for effecting the reception and transmission of dial signals, for example, to a remote exchange installation, in addition to the dial selector switches and/or quick operating switches required for initially establishing the demanded connection.

The complexity of the switching and coupling functions and the additional apparatus for effecting these functions may be more readily appreciated with reference to our copending application filed concurrently herewith and entitled "Switching Matrix for Use in Telephone Exchange Installations," Ser. No. 537,970. It is to be understood that the invention herein described and that of our copending application relate to distinct problems in the switching functions of telephone exchange installations and that the invention herein described is suitable for use with the system of our copending application.

In our copending application there is taught a switching matrix having a plurality of subscriber lines connected to the input side thereof and a plurality of outgoing connection lines connected to the output side thereof. Internal connecting sets, in addition to registers which receive the dialed information code, are connected to the output side of the matrix. When a subscriber initiates a call, a signal is transmitted to the marker, for example, in response to lifting of the receiver at the subscriber substation. The switching matrix is controlled by the marker to connect the subscriber's line with an available register. The register then receives the dialed information code from the subscriber. The register acts in response to the dial code to control the operation of a marker in establishing switch connections within the matrix.

If for example, the dial code represents a demand for an outgoing external connection, the marker effects a switch path through the matrix connecting the subscriber line to an appropriate, available transmission line. When a switch connection is established, upon the completion of dialing, the marker effects a direct connection through the matrix between the subscriber and transmission lines and releases the register. A dial information code must still be transmitted through the transmission line to the remote exchange installation for selecting the appropriate subscriber station or other apparatus at the remote station. As a result, when such dial information is required, the originally seized register which received the dial code must transmit the required dial information over an independent path to the repeater associated with the seized transmission line. To effect this transmission, the marker connected to the originally seized register must recognize from the dial information code that the called subscriber was associated with another exchange. The marker then operates, over special couplers, to seize a register transmitter. The register transmitter, in turn, must be switched over additional special switches to the repeater of the seized transmission line. Thereafter, the required dial information is transmitted to the distant exchange.

The special switches required for effecting connections between the register transmitters and the repeaters of the transmission lines are extremely complex in structure and require complex control systems, since every possible outgoing connection, i.e. each of the plurality of associated transmission lines connected to the output of the matrix, must be accessible from each register transmitter associated with a given exchange installation.

It is to be understood that the difficulty of prior art systems has been explained with relation to our copending application for convenience only, and that the invention of our copending application relates to improvements in switching capabilities other than that of the invention herein described.

The control system of the invention overcomes these and other objections of prior art systems and provides a control system of reduced complexity which is more efficient in operation, lower in cost of construction of the installation, and which provides improved service to the subscribers. The system of the invention also permits standardization of the circuit systems and switching processes required in establishing and maintaining demand circuit connections while permitting the circuit systems to be more fully utilized in performing their respective functions.

OBJECTS OF THE INVENTION

It is therefore an object of this invention to provide an improved control system for a telephone exchange installation.

A further object of this invention is to provide an improved central control system for completing required switching connections in establishing a demanded telephone connection.

Another object of this invention is to provide an improved central control system for a telephone exchange installation which provides improved switching connections between circuit systems required in establishing a demanded telephone connection.

Still a further object of this invention is to provide an improved control system permitting maximum utilization of the circuit systems required in responding to a dialed information code and in establishing the required switching paths for initially establishing and thereafter maintaining a demanded circuit connection.

Further objects of this invention will become apparent as the following description proceeds. The invention may be more readily appreciated with reference to the single drawing thereof which shows in diagrammatic, block diagram form the essential components of the system necessary for a complete understanding thereof on the part of one skilled in the art.

The system includes a switching matrix KF which is shown to include representative controlled or switchable paths. In actual circuit embodiment, the number of internal switching paths will obviously greatly exceed those indicated and will be determined by the intended capacity of the system. In addition, the connections or switching paths completed within the matrix KF are variable and are established, as required, under control of a marker MK in a well-known manner.

A plurality of subscribers, only two of which, T1 and T2, are shown, are connected through their respectively associated subscriber circuits TS1 and TS2 to a corresponding pluraltiy of input terminals on the input side of the matrix KF.

At the output side of matrix KF there are connected various circuit systems necessary for completing a demanded circuit connection. Relay sets VU1 and VU2 are connected to respectively associated outgoing transmission lines or trunks VL1 and VL2 and to corresponding output terminals on the matrix KF. In a practical system, a plurality of associated relay sets and transmission lines are connected to the output of the matrix KF and typically are grouped in accordance with routing requirements. Where the matrix KF and associated circuit systems are part of a central office, the transmission lines VL1 and VL2 may comprise trunk lines connecting the central office to a remote exchange. An outgoing external connection thus would be established on a transmission line such as either VL1 or VL2 for a given one of the subscribers T1 and T2. The lines VL1 and VL2 also may be long distance lines, local connection lines between exchanges at different places within the same general locality, or, if the installation (i.e., the matrix KF and associated systems) in question is a secondary or P.B.X. installation, they may represent further exchange lines.

There is further connected at the output side of matrix KF an internal connecting set JVS having input and output terminals EV and AV, respectively. The internal connecting set JVS provides for completing a connection between two subscribers such as T1 and T2 which are connected to the same installation, such as that represented by the matrix KF.

The installation further includes a register REG and a register connection switch RAK. The register REG is connected to the output of matrix KF at its input E and to the input of matrix KF at its output A. The marker MK is selectively connected through the coupler RAK to the register REG at the terminal F. The marker is also connected through control line *a* to the matrix KF. In addition, the subscriber circuits TS1 and TS2 are each connected independently to the marker MK.

It is to be understood that a plurality of internal connecting sets JVS and of registers REG are provided in accordance with the required capacity of the installation. For convenience, only one of each of these circuit systems is indicated.

The register REG provides for the reception, registration, and transmission of dial information codes. For this purpose, the matrix KF may be operated by marker MK to couple the input E of the register REG to the subscriber circuit such as TS1 of a calling subscriber T1. In a subsequent operation, the matrix KF may be further controlled to couple the output A of register REG to an idle, appropriate one of the outgoing connections such as the relay set VU1 and the trunk VL1. When the register REG is receiving an information code, its connection is similar to that of an outgoing external connection, and when it is transmitting an information code, its connection to the matrix KF is similar to that of a subscriber.

The circuit of the invention is effective for establishing both internal connections and outgoing external connections. An internal connection is defined as one wherein a calling subscriber is demanding a local call connection to a called subscriber, both the calling and called subscriber being connected to a common exchange installation such as that represented by the matrix KF and associated systems, commonly called a central office. An outgoing external connection is one wherein the called subscriber is connected to a different exchange than the calling subscriber. As noted previously, the system of the invention is also applicable for use as a secondary or P.B.X. installation or the like. The operation of the system of the invention in such other embodiments will be apparent to those skilled in the art from the following description of the system of the invention.

When preparing to make a call, a subscriber, such as T1, initially lifts the receiver of his telephone. In response thereto, the corresponding subscriber substation or circuit TS1 transmits an impulse to marker MK. Marker MK identifies the calling subscriber T1. The marker thereupon selects a free register REG and establishes a switch connection through matrix KF to connect the subscribed circuit TS1 to the input terminal E of the register REG. (The techniques for effecting selection of a free register and for establishing switching connections within a matrix KF are well known in the telephone exchange art and need not be further described herein.) Marker MK thereupon releases itself from the subscriber T1 and from the matrix KF, rendering it available for other connection purposes, for example, for responding to calls from other subscribers such as T2.

Register REG transmits an enabling signal such as a common dial tone to the calling subscriber T1 from its terminal E and through the switch connection of the matrix KF to the subscriber circuit TS1, Subscriber T1 thereupon demands the desired connection in the form of a conventional dial information code.

The register REG receives the dial information code through the aforedescribed switch circuit and recognizes the route of the demanded connection, i.e., whether an internal connection or an outgoing external connection. In recognizing the nature of a dial information codee, the register REG also determines that the subscriber T1 has provided a proper dial information code for completing a connection of some type.

Outgoing external connection

Initially it will be assumed that the dial information code is correct and demands an outgoing external connection. It will also be assumed that the trunk lines VL1 and VL2 and their associated relay sets represent outgoing trunks connected to different remote exchanges, and that the exchange associated with trunk line VL1 is the exchange corresponding to the called subscriber demanded by the calling subscriber T1. Upon recognition of the route corresponding to the connection demanded by the subscriber T1, the register transmits a request to the marker MK. If the marker MK is available, it connects itself to the inlet F of register REG over the output terminal F. The register REG thereupon transmits to the marker MK the dial information identifying the required route. The marker MK operates through the control line *a* to establish a connection within matrix KF for connecting the output terminal A of the register REG to the required trunk line, assumed above to be the line VL1 and its associated relay sets VU1, and hereinafter referred to as the seized repeater VU1. (The response of the marker MK and its operation in establishing the correct coupling connection are well known in the art and therefore are not described herein.)

The subscriber circuit TS1 is now connected through two switch paths to the appropriate seized set VU1, i.e., a first coupling path through the matrix KF to the register REG and a second coupling path from the register REG through the matrix KF to the seized relay set at VU1. When the coupling connections are completed, the register REG transmits the necessary dial information for enabling the remote exchange system corresponding to the seized relay set VU1 to select the called subscriber.

In effecting this transmission, register REG, with the aid of marker MK, is capable of suppressing portions of the dial information code from subscriber T1 which are unnecessary or have become superfluous and, conversely producing additional dial information which may be required in completing the connection. Register REG also is capable of temporarily storing the dial information code received from the subscriber circuit TS1. The storage capability may be required where the emission of the dial information code from the circuit TS1 is more rapid than the code transmission capability of the seized relay set VU1. The temporary storage capability also may be necessary to assure proper coordination of the dial code transmission with the switching functions of the installation. Register REG is also capable of effecting the necessary operations for transmission of the dial information code in accordance with the form of code information required by a given exchange, and by the transmission system providing connection to the remote exchange, for completing a long distance circuit connection. Examples of such operations which may be required include establishing pulses of the required characteristics suitable for the transmission system, tone frequency selection, frequency selection and modulation for multiplex transmission, and the like.

If the circuit demanded by calling subscriber T1 is successfully completed—i.e., the called subscribed answers the call—the register REG is no longer required in the circuit, since the relay set VU1 is capable of maintaining the successfully completed call connection. Thus, in response to answering of the call, the register REG makes a further request to the marker MK. The request of the register REG includes an identification signal, which identifies it out of the plurality of registers, and a request signal for its removal or release from the existing, successfully completed connection.

In a well-known manner, the marker MK performs an identification process for recognizing the circuit associated with the register REG which circuit, in the present illustration, includes the subscriber T1, the subscriber circuit TS1, and the relay set VU1. The marker MK then performs a path finding process for establishing a direct switch connection through the matrix KF for connecting circuit TS1 with the relay set VU1. If such a direct switch path is available, the marker MK simultaneously completes the direct coupling path and releases the previously established double coupling path, thereby freeing the register REG. Simultaneously with its release, the register REG terminates the control signal applied to the relay of relay set VU1, whereupon the latter system provides the signal driving potential for maintaining the completed connection.

Alternative means releasing register REG from the switch circuit are readily provided. For example, if a direct switch connection is not immediately available, the release of the register REG may be delayed until such a direct switch connection does become available. Conversely, the marker MK may reserve a direct switch path in the matrix KF concurrently with initially establishing the double switch path which inserted register REG in the circuit. Thus, the direct switch path would be immediately available for the aforedescribed switching operation upon completion of the call.

Upon the termination of the call connection between the calling subscriber T1 and the called subscribed, the supervisory circuit system of relay set VU1 may operate to make a request to marker MK to terminate the switch connection of the matrix KF. Conversely, the subscriber substation circuit TS1 may make such a request. In either case, the marker MK responds to a control signal indicating termination of the call to release the direct switch connection, thereby releasing both the subscriber T1 and the relay set VU1 for subsequent operations.

It will be appreciated that the system of the invention will result in substantial reduction in the complexity of the required control functions for effecting a demanded connection while providing greater flexibility in the use of the circuit systems. Full utilization of the circuit systems is attained, thereby reducing the cost of a given installation while providing improved service to the subscribers. Since the relatively complex and expensive registers REG are only connected in circuit for establishing a demanded connection and are thereafter removed from the circuit, while the appropriate circuit system necessary for maintaining the demanded connection continues that function exclusively, the total number of registers for a given installation may be reduced, with resultant cost reduction.

The system of the invention, by initially establishing a double coupling path providing a temporary series connection of the register REG and the appropriate relay set VU1 for the demanded connection, avoids the necessity of employing the special switching connectors as required in prior art systems for inserting the dial code information into the outgoing external connection. Thus, the relatively complex and expensive quick operating switches of prior art exchange installations may be omitted with a consequent reduction in the complexity of the switching mechanisms and of the control system which determines the switching operations, resulting in a substantial reduction in the cost of the installation.

Internal connection

If the dial code information transmitted from subscriber circuit TS1 corresponds to a demand for an internal connection, the register REG also transmits a request to the marker MK. This request identifies the register REG, the local subscriber, such as T2, which is being called, and a demand to complete a call to that subscriber T2. If the marker MK is free, it completes a switch connection through the matrix KF from the output A of the register REG to the input EV of the internal connecting set JVS. The marker MK also completes a switch connection from the output AV of the internal connecting set JVS through the matrix KF to the called subscriber circuit TS2.

The internal connecting set JVS includes a power source for supplying signal driving potential, which must be disconnected when the register REG is connected in series therewith. For this purpose the set JVS includes a relay operable in response to a control signal from the register REG for establishing a shunting or by-pass circuit which makes a direct connection between input EV and output AV across the system JVS. The register REG recognizes the answering of the call by the called subscriber T2 to establish a request to the marker MK to remove the register REG from the completed circuit and to provide a direct switch connection through the matrix KF from the output AV of the internal connecting set JVS to the subscriber circuit TS2.

Simultaneously with the establishment of the direct switch connection, the register REG is removed from the circuit and the holding relay in system JVS is de-energized, removing its shunting circuit. The internal connecting set JVS is thereby fully inserted into the completed circuit. The set JVS is directly connected through the matrix KF to both the calling subscriber T1 and the called subscriber T2 and maintains the calling connection for the duration of the call. At the termination of the call, the subscriber circuits TS1 and TS2 may each send a control signal to the marker MK, indicating termination of the call. Marker MK thereupon releases each of the substations from the matrix KF and releases the internal connecting set JVS, thereby freeing them for subsequent operations.

From the foregoing description, it will be appreciated that the system of the invention is versatile in operation and automatically provides the necessary circuit connections in response to a demand for either a local call requiring an internal connection or a long distance call requiring an outgoing external connection. The advantage of the system as described hereinbefore with regard to an outgoing external connection are also attained in the operation of the system when providing an internal connection. For example, in providing either of these two types of connections, it will be recalled that the register REG is connected in circuit only for initiating or establishing the connection. When the connection is completed, the register RSG is removed from the completed circuit which thereafter is sustained by a circuit system, illustratively either the relay set VU1 or the internal connecting set JVS, specifically provided for performing that particular function. Thus, the register REG is connected in circuit for only a minimum time for performing the specific function which it is intended to perform and thereafter is released for subsequent use. Maximum utilization of the register REG is thereby attained, resulting in reducing the number of such registers required for a given installation and reducing the cost of the installation. It will be appreciated that other of the advantages of the system as discussed previously with regard to an outgoing external connection are also attained in providing an internal connection.

It will be obvious to those skilled in the art that the system of the invention may be incorporated in a more complex installation employing a plurality of switching matrices having interconnection possibilities therebetween. In any installation employing the system of the invention, it is desirable that complete accessibility of the subscriber lines, trunks, circuit systems, registers and the like which are connected to the matrix be assured. In this manner, maximum flexibility in the switching operations is assured, resulting in attaining the maxmum benefits of the system.

It will be evident that many changes could be made in the system of the invention without departure from the scope thereof. Accordingly, the invention is not to be considered limited to the particular embodiment disclosed herein but only by the scope of the appended claims.

It is therefore intended by the appended claims to cover all such modifications and adaptations as fall within the true spirit and scope of the invention.

What is claimed is:

1. A switching system operable in response to a dial information code for establishing and maintaining completed circuit connections through a telephone installation including:
   - a switching matrix (KF) having input and output terminals and switch means controllable for providing connections between selected ones of said input and output terminals,
   - a first circuit system (VU1, VU2, JVS) necessary for maintaining a demanded call connection, connected to an output terminal of said matrix,
   - a second circuit system (REG) necessary for establishing a demanded call connection, connected across input and output terminals of said matrix, and
   - control means (MK) operable in response to a connection demand to provide a first switch connection through said matrix for connecting said second circuit system to a subscriber and a second switch connection through said matrix for connecting said first circuit system to said second circuit system, for establishing a demanded call connection, said control means also being operable in response to completion of said demanded call connection to establish a direct switch connection through said matrix for connecting said first system to said subscriber to maintain said demanded call connection and to release said first and second connections and said second circuit system.

2. A system as recited in claim 1 wherein said control means (MK) is operable to release said direct switch connection in response to termination of the demanded called connection.

3. A system as recited in claim 1 wherein there are further provided:
   - a plurality of subscribed circuits (TS1, TS2) connected to a corresponding plurality of said input terminals of said matrix (KF),
   - said control means (MK) being operable in response to the connection demanded by one of the subscribers of said circuits (TS1, TS2) to connect the calling subscriber circuit (TS1) through said first and second connections in said matrix (KF) to said second circuit system (REG) and to said first circuit system (VU1, VU2, JVS) for establishing a demanded call connection, and through said direct switch connection in said matrix to said first circuit system (VU1, VU2, JVS) for maintaining the completed call connection demanded by the calling subscriber (T1).

4. A system as recited in claim 3 wherein:

said first circuit system comprises an internal connection system (JVS) having input and output terminals (EV, AV) connected to corresponding output terminals of said matrix (KF) and said control means (MK) is operable in response to a demand for a local call connection to connect said calling subscriber circuit (TS1) with a local called subscriber circuit (TS2) through said first and second connections in said matrix including said first and second systems (JVS, REG) for establishing the demanded local call connection and for providing said direct switch connection through said matrix (KF) from said calling subscriber circuit (TS1) to said input terminal (EV) of said first system (JVS) and from said output terminal (AV) thereof through said matrix (KF) to said called subscriber circuit (TS2) for maintaining said demanded called connection.

References Cited

UNITED STATES PATENTS

| | | | |
|---|---|---|---|
| 2,587,817 | 3/1952 | Busch et al. | 179—18 |
| 1,675,886 | 7/1928 | Hague | 179—27 |

OTHER REFERENCES

A. O. Adam, "No. 5 Crossbar Marker," pp. 26–30, reprinted from Bell Lab Record, November 1950.

KATHLEEN R. CLAFFY, Primary Examiner

W. A. HELVESTINE, Assistant Examiner